May 8, 1945.   G. H. YOUNG   2,375,608
DUST COLLECTOR
Filed June 4, 1943   2 Sheets-Sheet 1

Inventor.
George Young.
by Robert T. Palmer
Attorney.

May 8, 1945. G. H. YOUNG 2,375,608
DUST COLLECTOR
Filed June 4, 1943 2 Sheets-Sheet 2

Inventor.
George Young.
by Robert T. Palmer
Attorney.

Patented May 8, 1945

2,375,608

UNITED STATES PATENT OFFICE 2,375,608

DUST COLLECTOR

George H. Young, Indianapolis, Ind., assignor to B. F. Sturtevant Company, Boston, Mass.

Application June 4, 1943, Serial No. 489,619

3 Claims. (Cl. 183—34)

This invention relates to dust collectors and has as its object, the provision of a compact, inexpensive dust collector which is particularly suitable for removing dust produced in manufacturing plants, from the air in such plants.

This invention provides in one housing a primary dust collector and a secondary dust collector. The primary collector is a horizontal cyclone which removes the larger dust particles from the air. The air is recirculated through the cyclone for further recovery and is then blown through filters forming the secondary collector, back into the room in which the unit is mounted.

The invention will now be described with reference to the drawings, of which:

Figure 1:
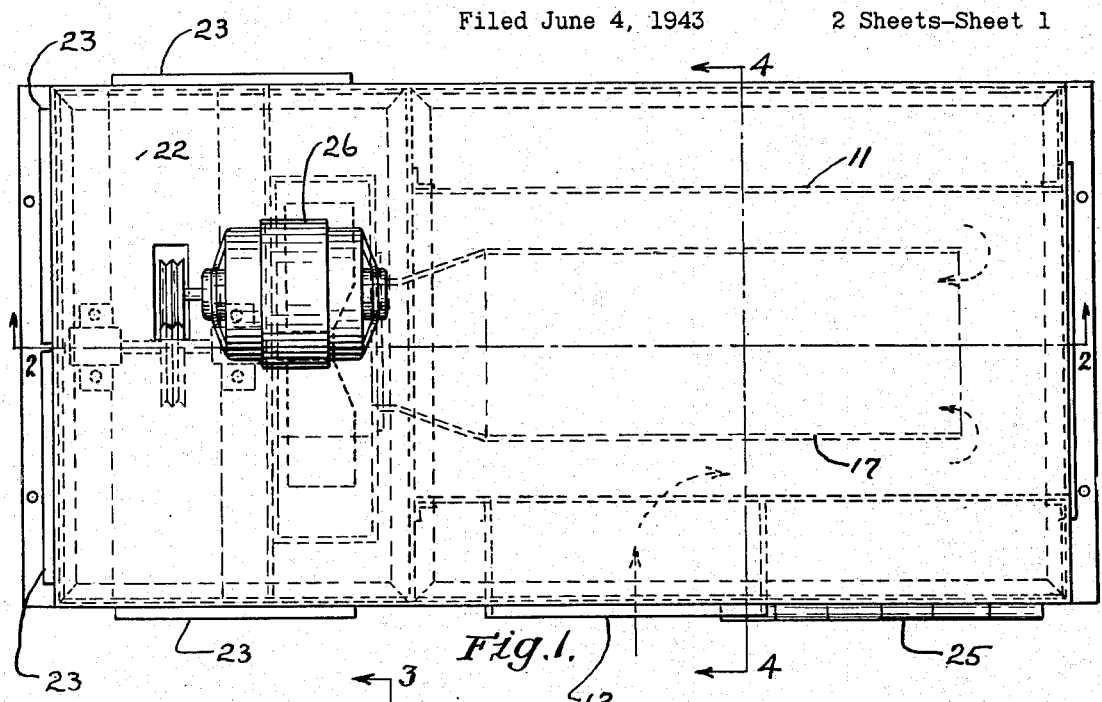
Fig. 1 is a plan view looking downwardly upon a dust collector embodying this invention.
Figure 2:
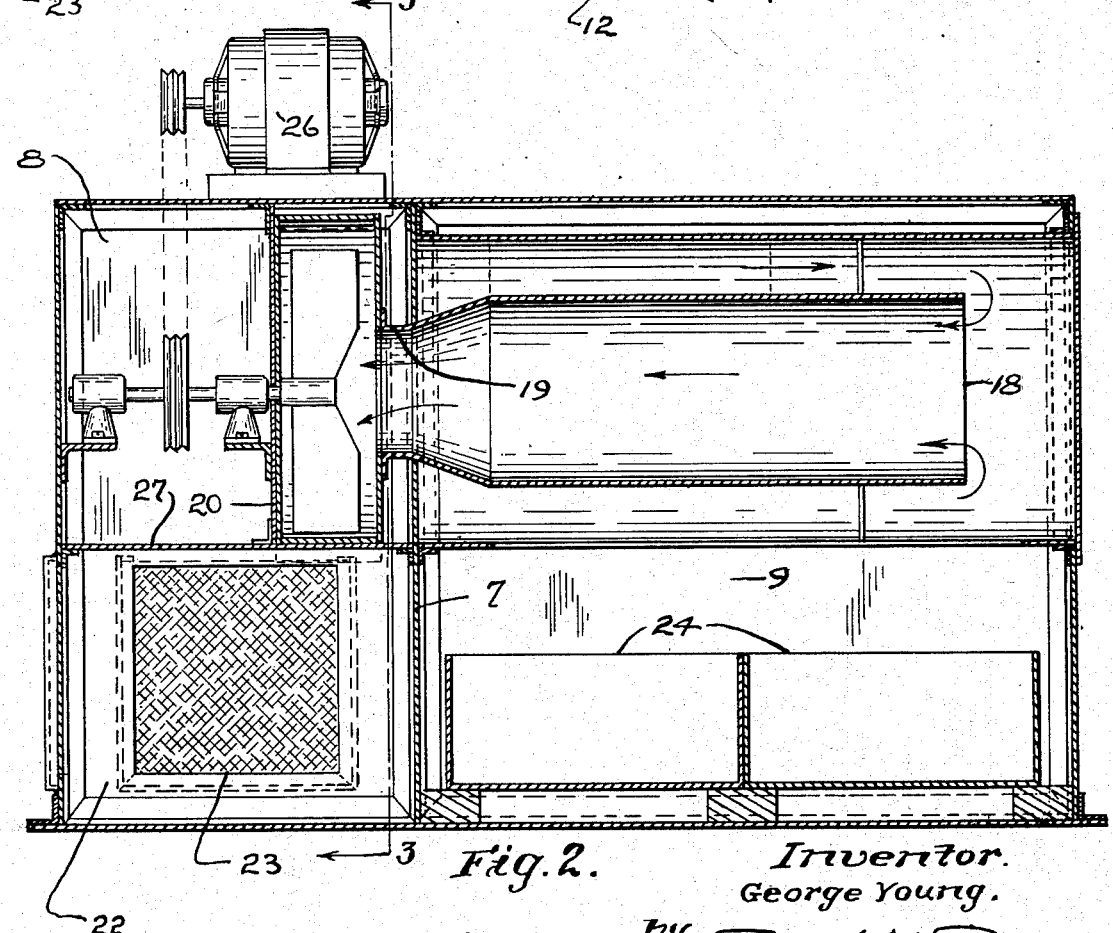
Fig. 2 is a sectional view along the lines 2—2 of Fig. 1.
Figures 3, 4:
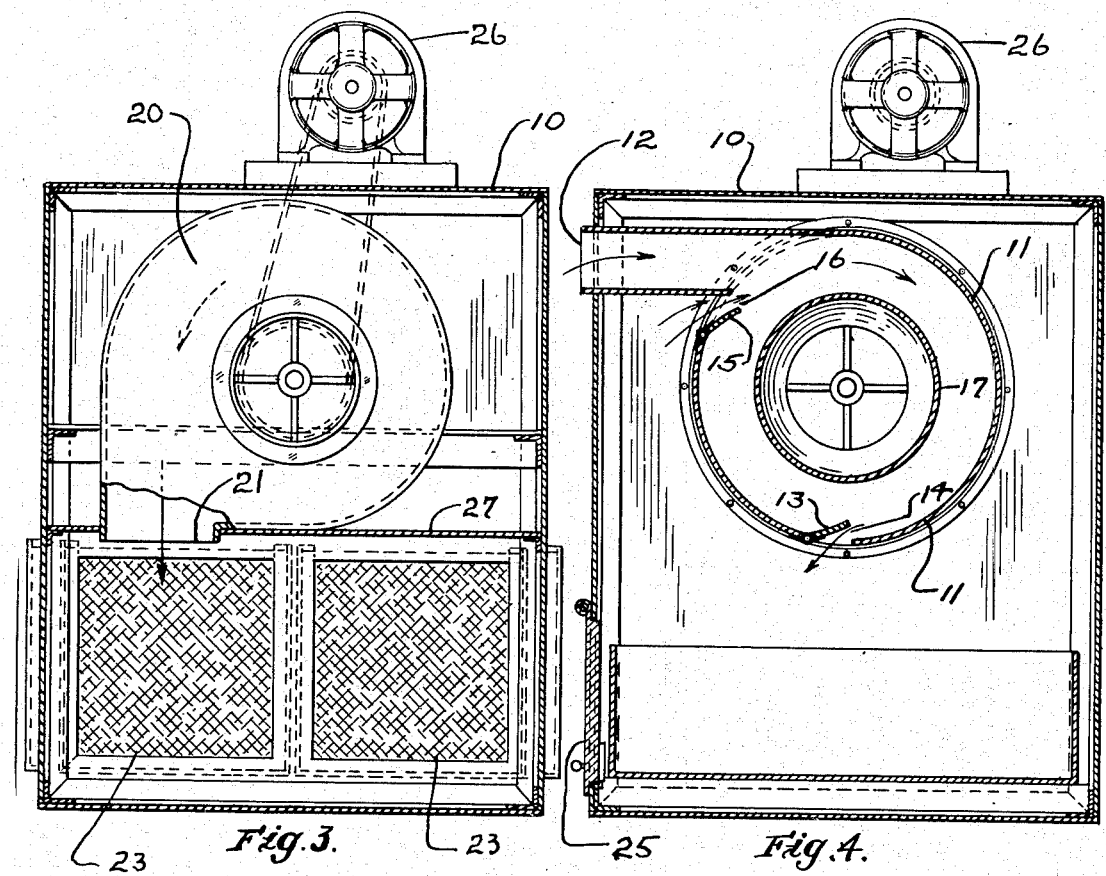
Fig. 3 is a sectional view along the lines 3—3 of Fig. 2.
Fig. 4 is a sectional view along the lines 4—4 of Fig. 1.
Figure 5:
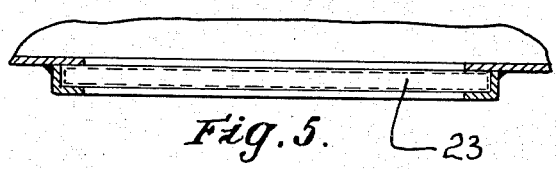
Fig. 5 is an enlarged view of one of the filter supports employed.

The rectangular sheet metal casing 10 contains the longitudinally extending, horizontal cylinder 11 having the tangential air inlet 12. The cylinder 11 has the adjustable member 13 in its lower wall forming the tangential skimming passage 14 and has just below the inlet 12, the adjustable member 15 forming the induction passage 16.

The cylinder 11 has the inlet cylinder 17 arranged concentrically therein. The outer end 18 of the cylinder 17 is open and the inner end is connected to the inlet 19 of the centrifugal fan 20.

The scroll outlet 21 of the fan 20 discharges into the filter chamber 22 which has the filters 23 arranged in three sides thereof. These filters are of the replaceable fibrous type which are commonly used in ventilating and air conditioning apparatus for cleaning air. The wall 7 separates the fan chamber 8 and the filter chamber 22 from the dust collection chamber 9.

The dust receiving boxes 24 are located in the dust collection chamber 9 on the floor thereof below the cylinder 11 and serve to collect the dust which is skimmed off in the passage 14 and then falls by gravity into the boxes. The hinged door 25 can be opened for the removal of the boxes 24.

The motor 26 is mounted on the top of the unit and serves to rotate the wheel of the fan by a standard V-belt drive.

The horizontal wall 27 separates the fan chamber 8 from the filter chamber 22 and prevents dust from the filter chamber from entering the fan chamber. The wall 27 has an opening from the outlet 21 of the fan.

In operation, the fan draws air through the open end of the inner cylinder 17, the space between the cylinders 17 and 11 and the inlet 12. The air entering the inlet 12 is given a spin and as a result the dust particles are thrown out against the inner surfaces of the cylinder 11 and are skimmed off through the passage 14 and fall into the boxes 24.

The air passing with the dust through the passage 14 is drawn by induction through the passage 16 and is recirculated with additional dust recovery.

Some of the finer dust passes into the fan 20 and is blown through the fan outlet 21 into the filter chamber 22 below the fan. The clean air then passes from this chamber into the room where the unit is located. The filters remove the fine dust from the air which issues as clean air from the unit.

This invention due to its effectiveness and low cost has found wide application in industrial plants such as airplane engine factories for removing dust from apparatus rooms and has obviated the necessity for the prior systems using ducts and associated elaborate apparatus.

What is claimed is:

1. In a dust collector having substantially horizontal upper and lower walls and substantially vertical side and end walls; a substantially horizontal cylinder extending longitudinally in the upper portion of said collector, said cylinder having an air inlet with means for spinning the air entering same, and having a tangential skimming channel in its lower wall; a smaller cylinder arranged substantially concentrically within said horizontal cylinder; a dust collection chamber below said cylinders; a centrifugal fan in said collector adjacent one end wall thereof, said fan having an axial, cylindrical inlet connected to said smaller cylinder, and having a tangential outlet, the combination of a substantially vertical partition extending from said upper wall to said lower wall of said collector between said horizontal cylinder and said collection chamber and said fan, said axial inlet of said fan extending through said partition; a substantially horizontal partition extending between said one end wall and said vertical partition below said fan, said outlet extending through said horizontal partition, said one end wall having an opening therein between said horizontal partition and said lower wall of said collector, and an air filter in said opening.

2. In a dust collector having substantially horizontal upper and lower walls and substantially vertical side and end walls; a substantially horizontal cylinder extending longitudinally in the upper portion of said collector, said cylinder having an air inlet with means for spinning the air entering same, and having a tangential skimming channel in its lower wall; a smaller cylinder arranged substantially concentrically within said horizontal cylinder; a dust collection chamber below said cylinders; a centrifugal fan in said collector adjacent one end wall thereof, said fan having an axial, cylindrical inlet connected to said smaller cylinder, and having a tangential outlet, the combination of a substantially vertical partition extending from said upper wall to said lower wall of said collector between said horizontal cylinder and said collection chamber and said fan, said axial inlet of said fan extending through said partition; a substantially horizontal partition extending between said one end wall and said vertical partition below said fan, said outlet extending through said horizontal partition, said side walls having openings therein below said horizontal partition and between said one end wall and said vertical partition, and air filters in said openings.

3. In a dust collector having substantially horizontal upper and lower walls and substantially vertical side and end walls; a substantially horizontal cylinder extending longitudinally in the upper portion of said collector, said cylinder having an air inlet with means for spinning the air entering same, and having a tangential skimming channel in its lower wall; a smaller cylinder arranged substantially concentrically within said horizontal cylinder; a dust collection chamber below said cylinders; a centrifugal fan in said collector adjacent one end wall thereof, said fan having an axial, cylindrical inlet connected to said smaller cylinder, and having a tangential outlet, the combination of a substantially vertical partition extending from said upper wall to said lower wall of said collector between said horizontal cylinder and said collection chamber and said fan, said axial inlet of said fan extending through said partition; a substantially horizontal partition extending between said one end wall and said vertical partition below said fan, said outlet extending through said horizontal partition, said one end wall having an opening therein between said horizontal partition and said lower wall of said collector, said side walls having openings therein below said horizontal partition and between said one end wall and said vertical partition, and air filters in said openings.

GEORGE H. YOUNG.